US008816981B2

United States Patent
Kai et al.

(10) Patent No.: US 8,816,981 B2
(45) Date of Patent: Aug. 26, 2014

(54) MOUNT STRUCTURE OF TOUCH PANEL WITH VIBRATION FUNCTION

(75) Inventors: Yoshihiro Kai, Kyoto (JP); Takao Hashimoto, Kyoto (JP); Yoshiko Suetomi, Kyoto (JP); Yuji Watazu, Kyoto (JP)

(73) Assignee: Nissha Printing Co., Ltd., Kyoto (JP)

( * ) Notice: Subject to any disclaimer, the term of this patent is extended or adjusted under 35 U.S.C. 154(b) by 292 days.

(21) Appl. No.: 13/393,013

(22) PCT Filed: Aug. 20, 2010

(86) PCT No.: PCT/JP2010/064054
§ 371 (c)(1),
(2), (4) Date: Feb. 28, 2012

(87) PCT Pub. No.: WO2011/024713
PCT Pub. Date: Mar. 3, 2011

(65) Prior Publication Data
US 2012/0162143 A1 Jun. 28, 2012

(30) Foreign Application Priority Data

Aug. 31, 2009 (JP) .................................. 2009-199532
Aug. 31, 2009 (JP) .................................. 2009-199533

(51) Int. Cl.
*G06F 3/041* (2006.01)
*H04M 19/04* (2006.01)
(Continued)

(52) U.S. Cl.
CPC ................ *G06F 3/016* (2013.01); *G06F 3/041* (2013.01); *H04M 2250/22* (2013.01); *H04M 19/047* (2013.01); *H04R 2400/03* (2013.01); *H04M 1/0283* (2013.01); *H04M 1/0266* (2013.01); *H04R 17/00* (2013.01); *G06F 1/1626* (2013.01); *H04R 2499/11* (2013.01); *H04M 1/03* (2013.01)
USPC ....................................................... 345/173

(58) Field of Classification Search
CPC .......... G06F 3/016; G06F 2203/013–2203/014
USPC ................................................ 345/173–183
See application file for complete search history.

(56) References Cited

U.S. PATENT DOCUMENTS 6,091,406 A * 7/2000 Kambara et al. .............. 345/177
(Continued)

FOREIGN PATENT DOCUMENTS

JP         9-161602           6/1997
(Continued)

OTHER PUBLICATIONS

International Search Report issued Oct. 12, 2010 in International (PCT) Application No. PCT/JP2010/064054.
(Continued)

*Primary Examiner* — Gene W Lee
(74) *Attorney, Agent, or Firm* — Wenderoth, Lind & Ponack, L.L.P.

(57) ABSTRACT

[Object] It is an object to provide a mount structure of a touch panel with a vibration function which is superior in impact resistance, dust-proofness, and drip-proofness, and can effectively transmit a vibration of a vibration element.

[Solution to Problem] The mount structure of the touch panel with the vibration function is characterized by including a touch panel body, a design sheet bonded to an upper surface of the touch panel body and having a transparent window part and a decorative part surrounding the transparent window part, a vibration element formed in a back surface peripheral part of the touch panel body and hidden by the decorative part, a casing dented so as to have a level difference to allow the above parts to be externally fitted in and having a recess part or an opening part for a display device, and a frame-shaped support part to support the back surface peripheral part of the touch panel body, in its bottom surface, an elastic member frame arranged on the support part and positioned on an outer edge side of the touch panel with respect to the vibrator, and a vibration control unit arranged inside the casing to apply a drive voltage to the vibration element.

3 Claims, 8 Drawing Sheets

(51) Int. Cl.
*H04R 17/00* (2006.01)
*G06F 1/16* (2006.01)
*G06F 3/01* (2006.01)
*H04M 1/02* (2006.01)
*H04M 1/03* (2006.01)

(56) References Cited

U.S. PATENT DOCUMENTS

| | | | |
|---|---|---|---|
| 7,602,384 B2* | 10/2009 | Rosenberg et al. | 345/173 |
| 7,701,445 B2* | 4/2010 | Inokawa et al. | 345/173 |
| 7,728,819 B2* | 6/2010 | Inokawa | 345/173 |
| 7,800,590 B2* | 9/2010 | Satoh et al. | 345/173 |
| 8,675,147 B2* | 3/2014 | Murakami | 349/12 |
| 2003/0067449 A1 | 4/2003 | Yoshikawa et al. | |
| 2004/0069605 A1* | 4/2004 | Takabatake et al. | 200/61.01 |
| 2004/0166331 A1* | 8/2004 | Yoshikawa et al. | 428/446 |
| 2005/0038944 A1 | 2/2005 | Harada et al. | |
| 2005/0057527 A1* | 3/2005 | Takenaka et al. | 345/173 |
| 2005/0253643 A1* | 11/2005 | Inokawa et al. | 327/517 |
| 2006/0050059 A1* | 3/2006 | Satoh et al. | 345/173 |
| 2006/0192771 A1* | 8/2006 | Rosenberg et al. | 345/173 |
| 2007/0146334 A1* | 6/2007 | Inokawa | 345/173 |
| 2007/0146348 A1* | 6/2007 | Villain | 345/173 |
| 2007/0182708 A1* | 8/2007 | Poupyrev et al. | 345/156 |
| 2008/0055277 A1* | 3/2008 | Takenaka et al. | 345/177 |
| 2008/0122315 A1 | 5/2008 | Maruyama et al. | |
| 2008/0216578 A1* | 9/2008 | Takashima et al. | 73/658 |
| 2008/0259046 A1* | 10/2008 | Carsanaro | 345/173 |
| 2009/0072662 A1* | 3/2009 | Sadler et al. | 310/319 |
| 2009/0243817 A1* | 10/2009 | Son | 340/407.2 |
| 2009/0278814 A1* | 11/2009 | Fang et al. | 345/173 |
| 2010/0225596 A1* | 9/2010 | Eldering | 345/173 |
| 2010/0225600 A1* | 9/2010 | Dai et al. | 345/173 |
| 2010/0328230 A1* | 12/2010 | Faubert et al. | 345/173 |
| 2011/0221703 A1* | 9/2011 | Dietz et al. | 345/174 |
| 2011/0304569 A1* | 12/2011 | Kai et al. | 345/173 |

FOREIGN PATENT DOCUMENTS

| | | |
|---|---|---|
| JP | 11-74661 | 3/1999 |
| JP | 2003-122507 | 4/2003 |
| JP | 2005-63149 | 3/2005 |
| JP | 2006-31415 | 2/2006 |
| JP | 2008-123453 | 5/2008 |

OTHER PUBLICATIONS

International Preliminary Report on Patentability issued Mar. 13, 2012 in International (PCT) Application No. PCT/JP2010/064054.

* cited by examiner

MOUNT STRUCTURE OF TOUCH PANEL WITH VIBRATION FUNCTION

TECHNICAL FIELD

The present invention relates to a mount structure of a touch panel with a vibration function mainly used for a mobile device such as a portable telephone, smart phone, PDA, car navigation device, digital camera, digital video camera, and portable game machine.

BACKGROUND ART

While a mobile device having a touch panel mounted on a front surface of a display device is in the wide market at the present, the touch panel mainly comes in a resistive type touch panel and a capacitive type touch panel. According to the resistive type touch panel, a movable plate and a support substrate are laminated with a slight insulation space left between the movable plate and the support substrate such that conductor layers formed on their opposed surfaces are separated from each other, and when the movable plate is pressed, the fact that the conductor layers are brought into contact with each other at the pressed position is electrically detected, and pressed position data representing the pressed position is outputted to an arithmetic processing unit. Meanwhile, according to the capacitive type touch panel, a position is detected by detecting a change in electrostatic capacity between a fingertip and a conductive film.

(1) According to the resistive type touch panel, as described above, since the movable plate and the support substrate have the laminated structure in which they are arranged with the slight insulation space left between them, pressed stroke to the movable plate is extremely small such as 0.01 to 0.5 mm, so that it is difficult for the operator to feel input operational feeling. In addition, as for the capacitive type, since the pressed stroke does not exist, the operator cannot feel the input operational feeling.

Thus, progress has been made on a tactile feedback type touch panel in which a vibration is generated from a simple drive circuit so as to be detected by an operator when an input operation surface is pressed, and felt by a pressing finger. For example, according to a patent literature 1, a piezoelectric substrate (vibration element) having a pair of drive electrodes (piezoelectric elements) adhered to opposed both surfaces is adhered to a movable plate or a support substrate directly or through the drive electrode, and when pressing to an input operation surface is detected, a drive voltage is applied to the pair of drive electrodes, and the movable plate or the support substrate is vibrated due to expansion and contraction of the piezoelectric substrate (vibration element).

(2) In addition, the mobile device is provided with a function to reproduce sound in general, but a cone-shaped speaker 800 is mounted in a casing 202 as a component separated from the above-described touch panel 204 (refer to FIG. 18). In this case, sound directionality is too high because movement of a vibration plate of the cone-shaped speaker 80 is constant, and there is a problem that the sound cannot be caught unless an ear is completely put to a hole 81. In addition, there are other problems that dust-proofness and water-proofness are poor because protection is provided with the mesh 81 such that the sound generated from the speaker 80 is not hindered, and there is a limit in design due to a mount design in consideration of the speaker 80.

Thus, the applicant has attempted to solve the problem by activating the touch panel as a speaker. That is, an audio output is generated by adhering the piezoelectric substrate having the pair of drive electrodes adhered to the opposed both surfaces to the movable plate or the support substrate of the touch panel directly or through the drive electrode, and applying the drive voltage to the pair of drive electrodes to vibrate the movable plate or the support substrate so as to execute the expansion and contraction of the piezoelectric substrate.

(3) By the way, use conditions of the mobile device is stricter than that of a device set in an office, and certain levels of impact resistance, dust-proofness, and drip-proofness are required because the mobile device could fall, or water droplets could be put on the mobile device.

Therefore, as shown in a patent literature 2, an elastic member frame is mounted on an outer periphery of a touch panel, and the mobile device is hermetically sealed when the elastic member frame (gasket) is pressed against a casing which covers an upper surface periphery of the touch panel in the shape of a frame, so that dust-proofing and water proofing functions and an impact resistance function are realized.

Patent Literature 1: Japanese Unexamined Patent Publication No. 2003-122507
Patent Literature 2: Japanese Unexamined Patent Publication No. 11-74661

SUMMARY OF INVENTION

Technical Problem

However, as for the mount structure of the conventional tactile feedback type touch panel 104 described in the above (1), when the hermetically sealed structure shown in the patent literature 2 in the above (3) is applied thereto, the vibration of the vibration element is attenuated in an input region by an elastic member frame 50 existing around the flame-shaped covering part of the casing 102 (refer to FIG. 13). That is, the touch panel cannot be effectively vibrated, and the vibration for the tactile feedback cannot be sufficiently transmitted to the operator.

In addition, as for the structure in which the touch panel is mounted as the speaker and activated as described in the above (2), when the hermetically sealed structure as shown in the patent literature 2 of the above (3) is applied thereto, the vibration of the vibration element is attenuated in an input region by the elastic member frame 50 existing around the flame-shaped covering part of the casing 102 (refer to FIG. 17). That is, the touch panel cannot be effectively vibrated, and the touch panel cannot sufficiently reproduce sound as the speaker.

The present invention is made to solve the above problems, and it is an object of the present invention to provide a mount structure of a touch panel with a vibration function such as a tactile feedback type touch panel or a touch panel combined with a speaker which is superior in impact resistance, dust-proofness, and drip-proofness, and can effectively transmit a vibration of a vibration element.

Solution to Problem

The present invention provides a mount structure of a touch panel with a vibration function having a configuration described below, in order to solve the above technical problems.

According to a first aspect of the present invention, there is provided a mount structure of a touch panel with a vibration function, characterized by comprising:
a touch panel body;
a design sheet bonded to an upper surface of the touch panel body, and having a transparent window part and a decorative part surrounding the transparent window part;

a vibration element formed in a back surface peripheral part of the touch panel body, and hidden by the decorative part;

a casing dented so as to have a level difference to allow the above parts to be externally fitted in, and having a recess part or an opening part for a display device, and a frame-shaped support part to support the back surface peripheral part of the touch panel body, in its bottom surface;

an elastic member frame arranged on the support part and positioned on an outer edge side of the touch panel with respect to the vibrator; and a vibration control unit arranged inside the casing to apply a drive voltage to the vibration element.

According to a second aspect of the present invention, there is provided the mount structure of the touch panel with the vibration function according to the first aspect, wherein the touch panel body is not provided with a low rigidity part having lowered rigidity.

According to a third aspect of the present invention, there is provided the mount structure of the touch panel with the vibration function according to the first or second aspect, wherein a concave part for vibration space is formed in the support part of the casing to prevent contact with the vibration element at a time of vibration.

According to a fourth aspect of the present invention, there is provided the mount structure of the touch panel with the vibration function according to the third aspect, wherein a cushion layer is provided on a bottom surface of the concave part for vibration space.

According to a fifth aspect of the present invention, there is provided the mount structure of the touch panel with the vibration function according to the first or second aspect, wherein a through hole part for vibration space is formed in the support part of the casing to prevent contact with the vibration element at a time of vibration.

According to a sixth aspect of the present invention, there is provided the mount structure of the touch panel with the vibration function according to any one of the first to fifth aspects, wherein the touch panel body is a resistive type touch panel comprising a support plate superior in transparency and rigidity, a lower electrode film attached on an upper surface of the support plate, and an upper electrode film oppositely arranged so as to have an air layer above the lower electrode film.

According to a seventh aspect of the present invention, there is provided the mount structure of the touch panel with the vibration function according to any one of the first to sixth aspects, wherein the vibration element comprises a base part, and an elongated vibration member cantilevered from the base part.

According to an eighth aspect of the present invention, there is provided the mount structure of the touch panel with the vibration function according to any one of the first to seventh aspects, wherein the vibration control unit is a tactile feedback control unit that detects a pressed operation to the touch panel body and then applies a drive voltage to the vibration element.

According to a ninth aspect of the present invention, there is provided the mount structure of the touch panel with the vibration function according to any one of the first to eighth aspects, wherein the vibration control unit is a speaker control unit that applies a drive voltage to the vibration element to reproduce sound.

Advantageous Effects of Invention

According to the present invention, the touch panel with the vibration function has the design sheet having the transparent window part and the decorative part surrounding that transparent window part on the upper surface of the touch panel body, and this is externally fitted in the casing, so that a seamless structure is provided such that there is no seam between an external surface of the touch panel with the vibration function and an external surface of the casing. In addition, the elastic member frame is arranged on the support part of the casing so as to be positioned on the outer edge side of the touch panel body with respect to the vibrator, so that the elastic member frame is not provided in a direction in which the vibration of the vibrator is attenuated in an input region. Therefore, impact resistance, dust-proofness, and drip-proofness are excellent, and the vibration of the vibration element can be effectively transmitted. As a result, in the case where the touch panel with the vibration function is the tactile feedback type touch panel, the operator can sufficiently feel input operational feeling. Furthermore, in the case where the touch panel with the vibration function serves both as the touch panel and the speaker, the touch panel can sufficiently reproduce sound as the speaker.

DESCRIPTION OF EMBODIMENTS

Hereinafter, a first embodiment of the present invention will be described with reference to the drawings.

First Embodiment

Figure 1:
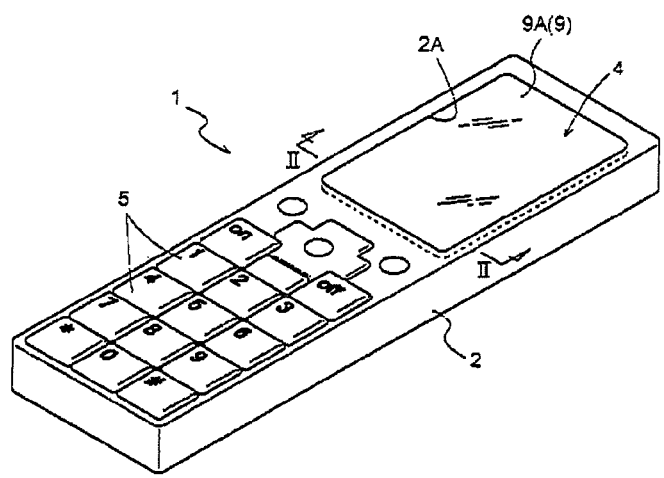
FIG. 1 is a perspective view of a portable telephone.
Figure 2:
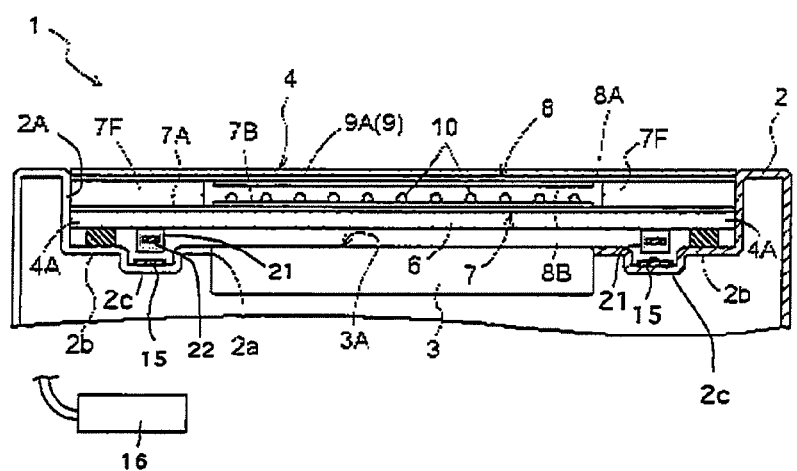
FIG. 2 is a cross-sectional view showing one example of a mount structure of a touch panel with a vibration function.

A panel member according to the present invention is used for mobile devices such as a portable telephone, smart phone, PDA, car navigation device, digital camera, digital video camera, and portable game machine. Here, a description will be made by illustrating a mount structure of a tactile feedback type touch panel used for the portable telephone as a panel member. FIG. 1 is a perspective view of a portable telephone 1. FIG. 2 is a cross-sectional view showing one example of a mount structure of a touch panel with a vibration function taken along a line II-II in FIG. 1, and FIG. 3 is an exploded cross-sectional view showing the one example of the mount structure of the touch panel with the vibration function.

Figure 3:
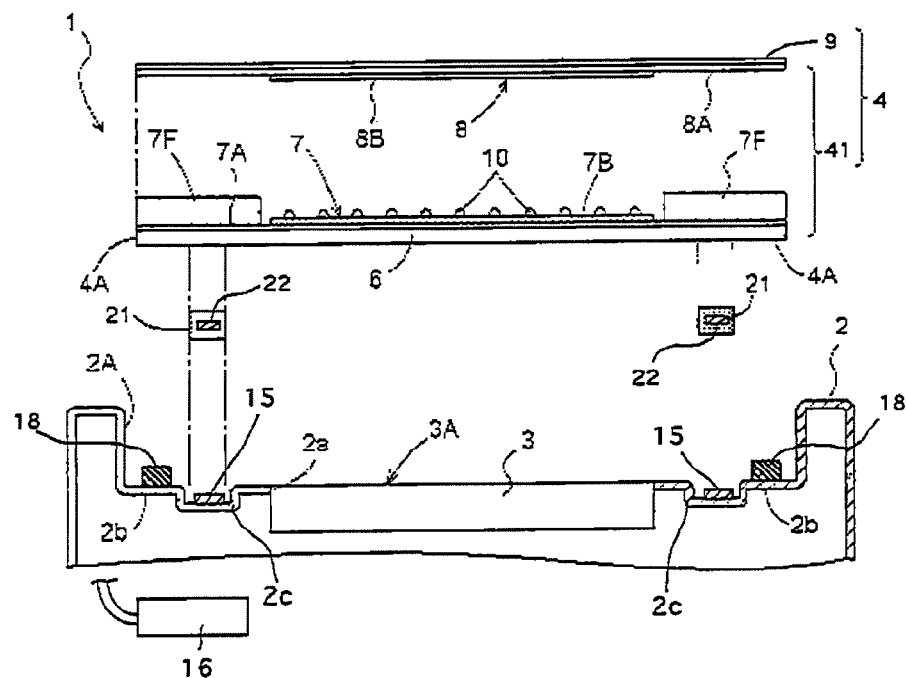
FIG. 3 is an exploded cross-sectional view showing the one example of the mount structure of the touch panel with the vibration function.

As shown in FIGS. 1 to 3, the portable telephone 1 having a touch panel 4 with a vibration function includes a synthetic resin casing 2 having a display window 2A etc. in its front surface, a display device 3 having a display part 3A such as a liquid crystal or an organic EL, the touch panel 4 with the vibration function to cover a surface of the display device 3, and a plurality of input keys 5.

As shown in FIGS. 1 and 2, the display window 2A of the casing 2 is dented so as to have a level difference to allow the touch panel 4 with the vibration function to be externally fitted in and opened so as to have an opening part 2a provided such that the display part 3A of the display device 3 provided inside the casing 2 can be viewed from the outside, and a frame-shaped support part 2b to support a back surface peripheral part 4A of the touch panel 4, in its bottom surface.

A shape and a size of the display window 2A can be variously changed according to a shape and a size of the touch panel 4 with the vibration function, a dented depth of the display window 2A can be variously changed according to a thickness of the touch panel 4, and a shape and a size of the opening part 2a in the display window 2A can be variously changed according to a shape and a size of the display part 3A. Here, the display window 2A, the opening part 2a, the display part 3A, and the touch panel 4 are rectangular or roughly rectangular in shape, and the dented depth of the display window 2A is set such that a surface of the casing 2 and a surface of the touch panel 4 with the vibration function are on the same level.

The touch panel 4 with the vibration function can be selected from a resistive type, a capacitive type, and an electromagnetic induction type. Here, a description will be made by illustrating the resistive type.

As shown in FIGS. 2 and 3, the touch panel 4 with the vibration function is configured so as to have a function as a resistive type touch panel A which includes a touch panel body 41 having a support plate 6 formed of a material superior in transparency, and rigidity such as glass or a resin, a lower electrode film 7 attached on an upper surface of the support plate 6, and an upper electrode film 8 oppositely arranged so as to have an air layer above the lower electrode film 7, and a design sheet 9 attached on an upper surface of the upper electrode film 8 of the touch panel body 41.

The resin used for the support plate 6 can be selected from resins superior in transparency and rigidity such as a polycarbonate resin (PC), methacryl resin (PMMA), acrylonitril-styrene copolymer resin (AS), acrylonitril-butadiene-styrene resin copolymer (ABS), cellulose propionate resin (CP), polystyrene resin (PS), polyester resin, and polyethylene resin (PE), and it is preferable to use the polycarbonate resin (PC) or the methacryl resin (PMMA) which is especially superior in transparency. In addition, the glass used for the support plate 6 includes soda glass, borosilicate glass, and reinforce glass.

In addition, a thickness of the support plate 6 can be selected from a range of 0.5 to 3.0 mm, and especially 1.0 mm is preferable. Furthermore, the support plate 6 may have a low rigidity part such as a part whose rigidity is lowered by providing recessed groove parts in parallel in two opposite sides of a peripheral part, to be easily vibrated, but the low rigidity part whose rigidity is lowered is not formed in this embodiment.

Figure 4:
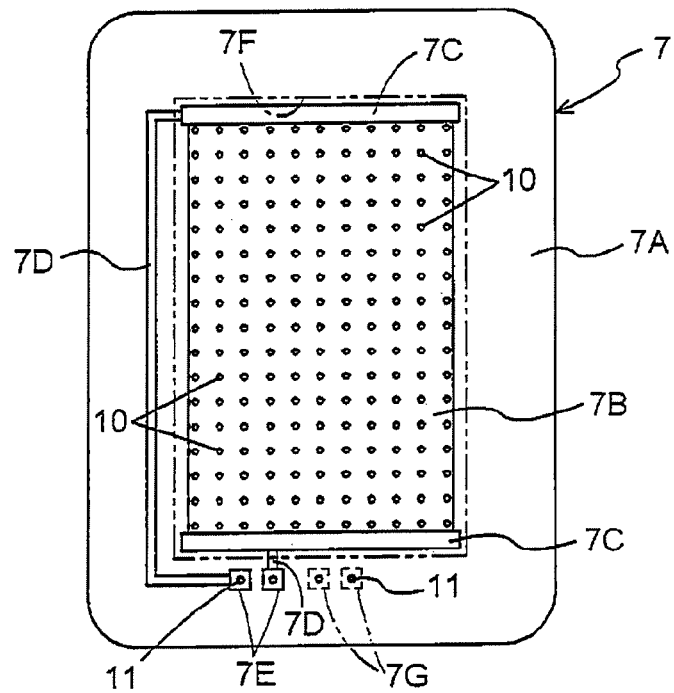
FIG. 4 is a plan view of a lower electrode film.

As shown in FIGS. 2 to 4, the lower electrode film 7 is configured such that a rectangular transparent conductive film 7B, a pair of parallel lower bus bars 7C arranged in two opposite sides of the transparent conductive film 7B, a pair of routing circuits 7D and a pair of connection electrodes 7E arranged in a periphery of the transparent conductive film 7B, and a frame-shaped bonding layer 7F are formed on the upper surface of a transparent insulating base material 7A.

Figure 5:
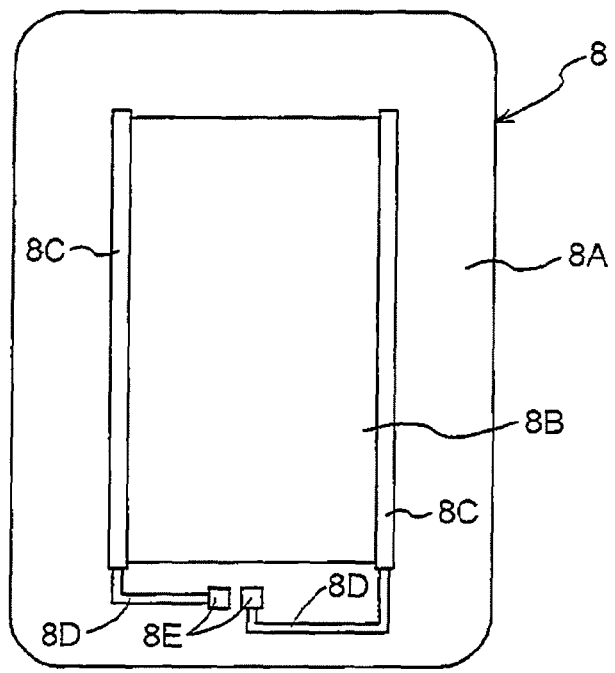
FIG. 5 is a bottom view of an upper electrode film.

As shown in FIGS. 2, 3, and 5, the upper electrode film 8 is configured such that a rectangular transparent conductive film 8B, a pair of parallel upper bus bars 8C arranged in two opposite sides of the transparent conductive film 8B, and a pair of routing circuits 8D and a pair of connection electrodes 8E arranged in a periphery of the transparent conductive film 8B are formed on a lower surface of a flexible transparent insulating base material 8A having a property of bending due to depressing of a finger etc.

The transparent insulating base material 7A of the lower electrode film 7, and the flexible transparent insulating base material 8A of the upper electrode film 8 may be formed of engineering plastic such as polycarbonate based, polyamide based, or polyether ketone based engineering plastic, or a transparent film such as acrylic based, polyethylene terephthalate based, or polybutylene terephthalate based transparent film.

The transparent conductive films 73 and 83 of the lower electrode film 7 and the upper electrode film 8, respectively may include a metal oxide film formed of a tin oxide, indium oxide, antimony oxide, zinc oxide, cadmium oxide, or indium tin oxide (ITO); a composite film mainly containing the above metal oxides; or a metal film formed of gold, silver, copper, tin, nickel, aluminum, or palladium. Alternatively, the transparent conductive films 7B and 8B may be a multilayer having two or more layers.

The transparent conductive films 7B and 83 may be formed by vacuum vapor deposition, sputtering, ion plating, or CVD.

As shown in FIGS. 1 to 3, a plurality of fine dot-shaped spacers 10 may be formed on the one surface of the transparent conductive films 73 and 8B, in order to prevent an error contact when the transparent conductive films 73 and 8B are opposed.

The spacer 10 may be formed of a transparent photo-curable resin such as epoxy acrylate based, or urethane acrylate based transparent photo-curable resin; or a transparent thermosetting resin such as polyester based or epoxy based transparent thermosetting resin. In addition, the space 10 may be formed by a printing method such as screen printing, or a photo process.

The lower bus bar 7C, the upper bus bar 8C, the routing circuits 7D and 80, and the connection electrodes 7E and 8E may be formed of metals such as gold, silver, copper, and nickel; or a paste having conductivity such as carbon. In addition, they may be formed by a printing method such as screen printing, offset printing, gravure printing, or flexography printing; a photoresist method; or a brush painting method.

In general, the lower bus bar 7C and the upper bus bar 8C are to be formed possibly at end parts of the transparent insulating base material 7A and the flexible transparent insulating base material 8A, respectively to a maximum extent, so that an area except for the lower bus bar 7C or the upper bus bar 8C can be ensured as large as possible in a center part of the transparent insulating base material 7A or the flexible transparent insulating base material 8A.

As for the area except for the lower bus bar 7C or the upper bus bar 8C, that is, an input area and a display area, a size and a shape thereof can be variously changed according to a size and a shape of an input area and a display area in the mobile device with the touch panel such as the portable telephone 1.

Figure 11:
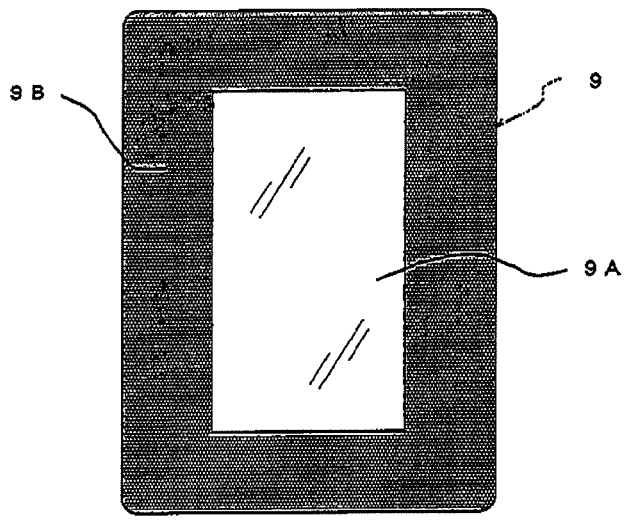
FIG. 11 is a plan view of a design sheet.
Figure 13:
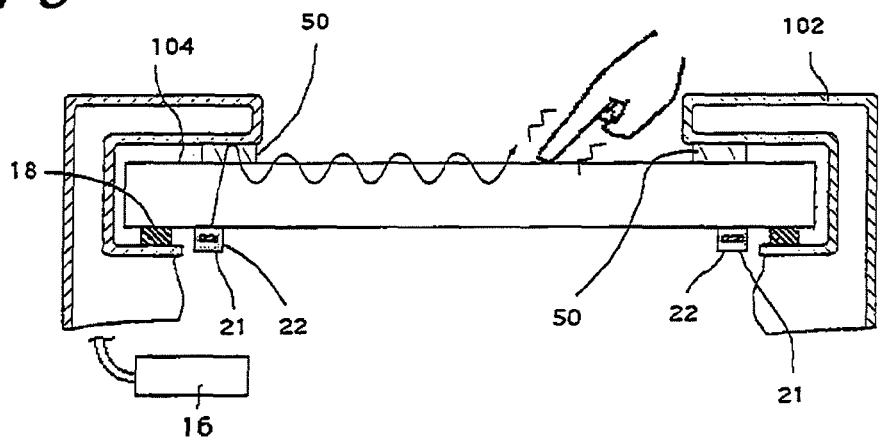
FIG. 13 is a schematic view showing that a vibration of the tactile feedback type touch panel is attenuated by an elastic member frame.

The design sheet 9 includes a hard coat layer (not shown) formed on an upper surface of a flexible transparent insulating base material 9A, and a designed layer and a bonding layer (both are not shown) formed on a lower surface thereof. As described above, since the bus bars 7C and 8C, and the routing circuits 7D and 8D which are opaque are provided on the lower electrode film 7 and the upper electrode film 8, respectively, the designed layer is provided in order to cover and hide these. That is, as shown in FIG. 11, the design sheet 9 has the transparent window part 9A and a decorative part 9B which surrounds the transparent window part 9A, in which a part having the designed layer serves as the decorative part 93, and a part not having the designed layer serves as the transparent window part 9A. Therefore, there is no need to have a mount structure according to a conventional technique in which an upper surface periphery of a touch panel is covered with a casing in the shape of a frame (refer to FIG. 13).

Figure 12:
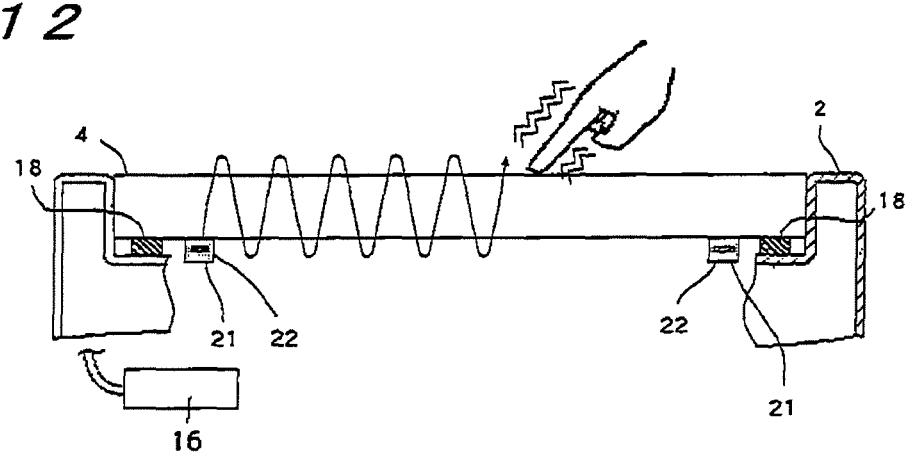
FIG. 12 is a schematic view showing behavior of a vibration transmitted in a tactile feedback type touch panel.

The touch panel 4 with the vibration function has the design sheet 9 having the transparent window part and the decorative part which surrounds the transparent window part on the upper surface of the touch panel body 41, and this is externally fitted in the casing as shown in FIG. 12, so that a seamless structure is provided such that there is no seam between an external surface of the touch panel 4 with the vibration function; and an external surface of the casing 2. Therefore, dust-proofness and drip-proofness are excellent, and vibration of a vibration element can be effectively transmitted. That is, an operator can sufficiently feel input operational feeling.

The flexible transparent insulating base material 9A of the design sheet 9 may be formed of engineering plastic such as polycarbonate based, polyamide based, or polyether ketone based engineering plastic; or a transparent film such as acrylic based, polyethylene terephthalate based, or polybutylene terephthalate based transparent film.

A thickness of the flexible transparent insulating base material 9A can be selected from a range of 50 to 200 μm, and 100 to 125 μm is especially preferable.

A material used for the hard coat layer of the design sheet 9 includes an inorganic material such as a siloxane based resin; or an organic material such as a thermosetting resin such as an acrylic epoxy based, or urethane based thermosetting resin, or an acrylate based photo-curable resin. A thickness of the hard coat layer is preferably about 1 to 7 μm.

The hard coat layer may be formed by a coating method such as roll coating, or spray coating; or a normal printing method such as screen printing, offset printing, gravure printing, or flexographic printing. In addition, the hard coat layer may be directly formed on the upper surface of the flexible transparent insulating base material 9A having the lower surface on which the designed layer and the bonding layer are directly formed, or may be formed on a flexible transparent insulating base material different from the flexible transparent insulating base material 9A having the lower surface on which the designed layer and the bonding layer are directly formed, and both of the flexible transparent insulating base materials may be bonded to each other.

In the design sheet 9, a non-glare process may be performed to prevent light reflection in such a manner that the flexible transparent insulating base material 9A or the hard coat layer is embossed, or fine particles of silica or alumina serving as a body pigments are mixed in the hard coat layer.

The designed layer may be formed with colored ink containing a pigment or dye having an appropriate color as a coloring agent, and a binder including a resin such as a polyvinyl based resin, polyamide based resin, polyester based resin, polyacrylic based resin, polyurethane based resin, polyvinyl acetal based resin, polyester urethane based resin, or alkyd resin.

The designed layer may be formed by a normal printing method such as screen printing, offset printing, gravure printing, or flexographic printing. Especially, when multicolor printing or gradation expression is executed, the offset printing or gravure printing method is suitable.

In addition, the designed layer may include a metal thin film layer, or a combination of a designed print layer and the metal thin film layer. The metal thin film layer expresses metal luster as a patterned layer, and this is formed by vacuum vapor deposition, sputtering, ion plating, or plating. In this case, a metal such, as aluminum, nickel, gold, platinum, chrome iron, copper, tin, indium, silver, titanium, lead, or zinc, or an alloy or composition of these is used, based on the metal luster color to be expressed. A film thickness of the metal thin film layer is about 0.05 μm in general. In addition, in providing the metal thin film layer, a pre-anchor layer or post-anchor layer may be provided in order to improve adhesiveness with another layer.

The bonding layer is appropriately formed of a heat-sensitive or pressure-sensitive resin which is suitable for the flexible transparent insulating base material 8A of the upper electrode film 8, and the flexible transparent insulating base material 9A of the design sheet 9. For example, in a case where the flexible transparent insulating base materials 8A and 9A are formed polycarbonate based or polyamide based engineering plastic, a polyacrylic based resin, polystyrene based resin, or polyamide based resin may be used, and in a case where the flexible transparent insulating base materials 8A and 9A are formed of acrylic based or polyethylene terephthalate based transparent film, vinyl chloride, vinyl acetate, or acrylic copolymer may be used.

The bonding layer may be formed by a normal printing method such as screen printing, offset printing, gravure printing, or flexographic printing.

Hereinafter, a detailed description will be made of a configuration of the touch panel 4 with the vibration function illustrated in this embodiment, with reference to FIGS. 1 to 5.

First, an ultraviolet curable acrylic based hard coat is applied by roll coating to one surface of the flexible transparent insulating base material 8A formed by a roll-shaped polyethylene terephthalate film (hereinafter, referred to as the PET film) having a thickness of 75 μm, whereby a PET film having the hard coat formed on the one surface is provided. Then, an indium tin oxide film (hereinafter, referred to as the ITO film) is formed on the hard coat surface by sputtering. Then, the film is cut into a sheet shape such that length and width thereof have predetermined dimensions, an etching resist is applied into a patterned shape on the ITO film by screen printing, and an unnecessary ITO film is removed with sulfuric acid, whereby the rectangular transparent conductive film 8B is formed. After the etching, the resist is removed by alkaline cleaning, the pair of parallel upper bus bars 8C, the pair of routing circuits 8D, and the pair of connection electrodes 8E are formed in the two opposite sides and in the periphery of the transparent conductive film 8B by screen printing using a silver paste. Thus, the upper electrode film 8 is provided.

Then, an ultraviolet curable acrylic based hard coat is applied by roll coating onto both surfaces of the flexible transparent insulating base material 9A formed by a roll-shaped PET film having a thickness of 125 µm, whereby a PET film having the hard coats on both surfaces is provided. Then, the film is cut into a sheet shape such that its length and width become the same dimensions as those of the upper electrode film 8, and the designed layer, and the bonding layer made of a transparent adhesive agent containing acrylic acid ester as a main component are formed on its one surface by gravure printing. Thus, the design sheet 9 is provided.

Then, the obtained upper electrode film 8 and design sheet 9 are wholly bonded through the bonding layer of the design sheet 9 such that the surface not having the ITO film of the upper electrode film 8 is opposed to the designed layer surface of the design sheet 9.

Meanwhile, an ultraviolet curable acrylic based hard coat is applied by roll coating to both surfaces of the transparent insulating base material 7A formed by a roll-shaped polycarbonate film (hereinafter, referred to as the PC film) having a thickness of 100 µm, whereby a PC film having the hard coat on both surfaces, and then the ITO film is formed on its one surface by sputtering. Then, the film is cut into a sheet shape such that its length and width become the same dimensions as those of the upper electrode film 8, an etching resist is applied in a pattern on the ITO film by screen printing, and an unnecessary ITO film is removed with sulfuric acid, whereby the rectangular transparent conductive film 7B is formed. Then, the fine dot-shaped spacers 10 are formed on the entire surface of the transparent conductive film 7B by screen printing using an epoxy acrylate based thermosetting resin, and the pair of parallel lower bus bars 7C, the pair of routing circuits 7D, and the pair of connection electrodes 7E are formed in the two opposite sides and in the periphery of the transparent conductive film 7B by screen printing using silver paste. Then, an adhesive agent having diffused resin beads plated with nickel is applied by screen printing to the pair of connection electrodes 7E, and two connection portions 7G for the connection electrodes 8E of the upper electrode film 8, and adhesive agent ink containing acrylic acid ester as a main component is applied by screen printing to the peripheral part except for those portions, whereby a frame-shaped bonding layer 7F is formed. Thus, the lower electrode film 7 is provided.

Then, a polycarbonate plate having a thickness of 1.0 mm serving as the support plate 6 is bonded to the surface not having the ITO film of the lower electrode film 7 entirely with an adhesive agent containing acrylic acid ester as a main component, and thereafter, four through holes 11 are formed in one side edge portion of the peripheral part with a drill so as to be linearly arranged along the one side edge. Each of the four through holes 11 is 1 mm in diameter and is formed in parallel to a thickness direction of the support plate 6 and the lower electrode film 7, and penetrates the connection electrode 7E or the connection portion 7G. A silver paste serving as a conductive agent is filled in each through hole 11 with a dispenser.

Then, the lower electrode film 7 bonded to the support plate 6, and the upper electrode film 8 bonded to the design sheet 9 are bonded through the bonding layer 7F of the lower electrode film 7 in such a manner that the transparent conductive films 7B and 8B are opposed to each other across the air layer, the lower bus bar 7C is perpendicular to the upper bus bar 8C, and the position of forming the connection electrode 8E of the upper electrode film 8 coincides with the position of forming the corresponding through hole 11.

Then, a flexible printed circuit (hereinafter, referred to as the FPC) is produced with a film having a circuit formed by copper foil and formed on one surface of a polyimide film, holes are made in an end electrode part of the FPC, the holes are brought in line with the through holes 11 of the support plate 6, and metal pins are inserted thereto by an ultrasonic press-in machine, whereby a cable which can take out a touch input signal is provided on the surface not having a lower electrode film in the support plate 6.

The touch panel 4 with the vibration function obtained as described above is externally fitted and mounted in the casing 2. In addition, an elastic member frame 18 has been arranged on the support part 2b of the casing 2 in such a manner that the elastic member frame 18 is positioned on the outer edge side of the touch panel body 41 with respect to a vibrator, so that the elastic member frame 18 is not provided in a direction in which the vibration of the vibrator is attenuated in an input region. The elastic member frame 18 may be formed of a silicon based resin, foamable polyurethane resin, polyolefin resin, or a material having elasticity such as a rubber.

A tactile feedback control unit 16 is provided inside the casing 2 as a vibration control unit which receives a signal from the touch panel body 41 and then detects a pressed operation of the touch panel 4. Thus, when the tactile feedback control unit 16 detects the pressed operation of the touch panel, a predetermined drive voltage is applied to a piezoelectric element 22 serving as one example of the vibration element to expand and contract the piezoelectric element 22. Thus, the touch panel is set so as to be vibrated by the expansion and contraction of the piezoelectric element 22. In addition, the tactile feedback control unit 16 may be mounted on the cable and arranged inside the casing 2.

Figure 6:
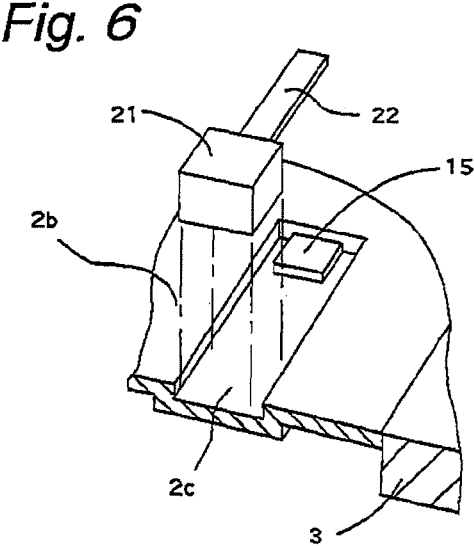
FIG. 6 is a perspective view showing a concave part for vibration space of a casing.

As shown in FIGS. 2, 3, and 6, the vibration element includes a base part 21 and the piezoelectric element 22 of the vibration member in such a manner that the piezoelectric element 22 is firstly mounted on the base part 21 formed of a resin, and then the base part 21 is attached onto a back surface of the touch panel body 41 with a double-sided tape or adhesive agent. In addition, the vibration element is arranged so as to be hidden by the decorative part 9B of the design sheet 9.

When the vibration element including the base part 21 and the piezoelectric element 22 is arranged so as to be in contact with the support part 2b of the casing 2, the vibration of the vibration element is limited by the support part 2b, so that a concave part for vibration space (vibration space concave part) 2c is formed in the support part 2b such that both are not in contact with each other as shown in FIGS. 2, 3, and 6.

In addition, in a case where a cushion layer 15 is provided on a bottom surface of the concave part for vibration space 2c, even when the mobile device falls to a hard floor such as the concrete, and the vibrator excessively vibrates due to the impact and hits against the other part such as the casing or liquid crystal display, the cushion layer 15 absorbs and softens the impact generated when the vibration element hits against the casing 2, so that the piezoelectric element 22 of the vibrator is not damaged. In addition, at the time of the vibration as the tactile feedback, since the piezoelectric element 22 of the vibrator is not in contact with the cushion layer 15, so that the vibration of the vibration element is not attenuated.

A material of the cushion layer 15 includes various kinds of thermoplastic elastomers, or a rubber based resin such as butadiene, silicon, or urethane. A thickness of the cushion layer 15 can be appropriately set within a range of 5 to 3000 μm. When the cushion layer 15 is less than 5 μm, a function to absorb the impact cannot be attained, and when the cushion layer 15 is more than 3000 μm, the concave part for vibration space 2c has to be deeply formed, so that the casing shape becomes complicated. As for a method for forming the cushion layer 15, when the layer is thin, a method such as printing, applying, or coating is suitable, while when the film is thick, a method in which a potted or casted one is applied is suitable.

In addition, the cushion layer 15 may be formed so as to cover the entire concave part for vibration space 2c or so as to cover only the part opposed to an end part of the vibration element, in the concave part for vibration space 2c as shown in FIG. 6.

The piezoelectric element 22 is not especially limited in shape, but it is preferably formed into an elongated vibration member cantilevered by the base part 21, that is, a cantilever shape as shown in FIG. 6. When the piezoelectric element 22 has the cantilever shape, the vibration of the touch panel 4 with the vibration function can be increased while a contact surface between the piezoelectric element 22 and the touch panel can be only a small area of the base part 21 of the piezoelectric element 22. A direction of the piezoelectric element 22 is not especially limited.

Second Embodiment

Figure 14:
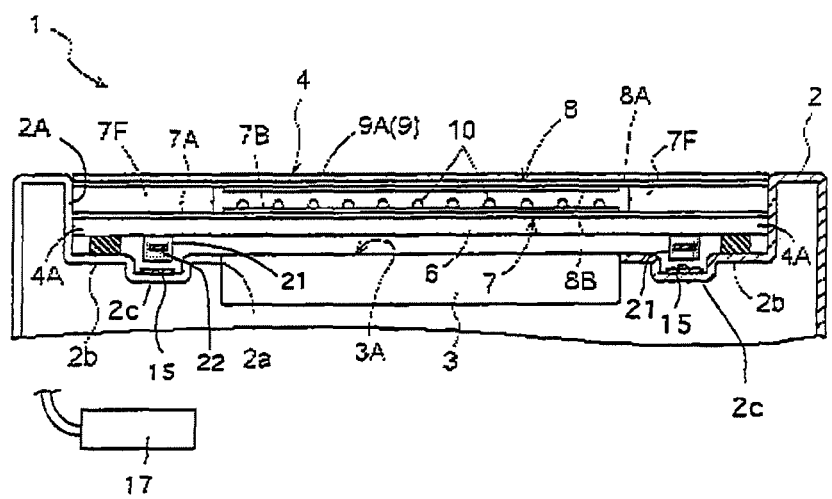
FIG. 14 is a cross-sectional view showing an other example of a mount structure of a touch panel with a vibration function.
Figure 15:
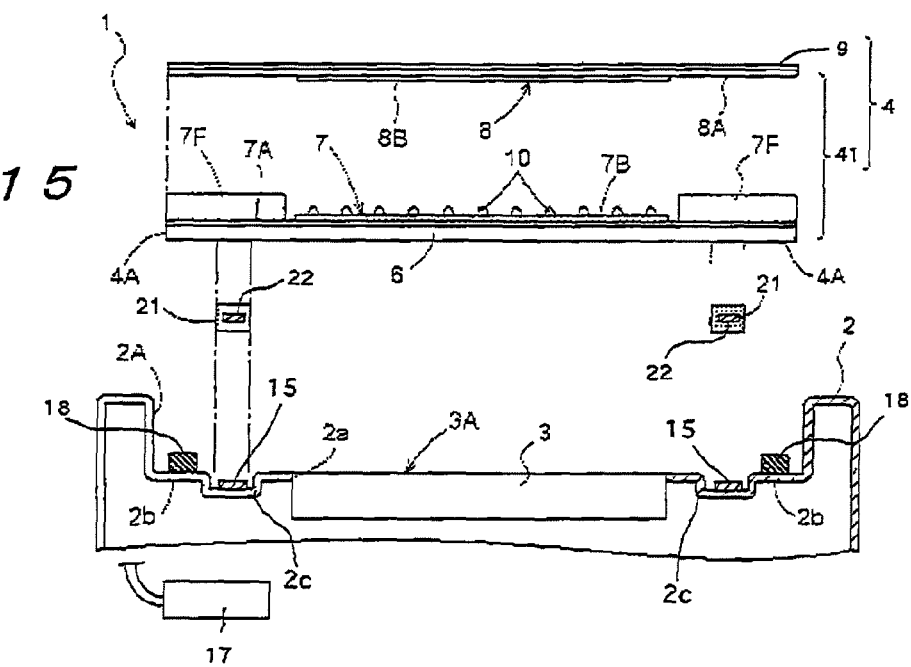
FIG. 15 is an exploded cross-sectional view showing the other example of the mount structure of the touch panel with the vibration function.

Next, a description will be made by illustrating an example of a mount structure serving both as a touch panel and a speaker used in a portable telephone, as a panel member according to the present invention. FIG. 14 is a cross-sectional view showing an other example of a mount structure of a touch panel with a vibration function taken along a line II-II in FIG. 1, and FIG. 15 is an exploded cross-sectional view showing the other example of the mount structure of the touch panel with the vibration function.

While the tactile feedback control unit 16 is arranged inside the casing 2 as the vibration control unit in the first embodiment, a second embodiment only differs from the first embodiment in that a speaker control unit 17 is arranged inside the casing 2 as a vibration control unit (refer to FIGS. 14 and 15), and others are the same as those of the first embodiment. The speaker control unit 17 applies a predetermined drive voltage to the piezoelectric element 22 serving as one example of the vibration element to expand and contract the piezoelectric element 22. The touch panel 4 is set to vibrate and generate sound due to the expansion and contraction of the piezoelectric element 22. In addition, the speaker control unit 17 also may be mounted on the cable and arranged inside the casing 2.

Figure 16:
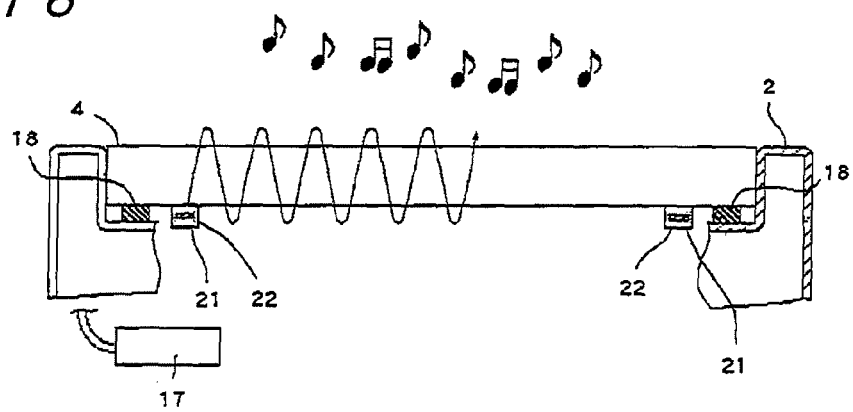
FIG. 16 is a schematic view showing behavior of a vibration transmitted in a touch panel combined with a speaker.
Figure 17:
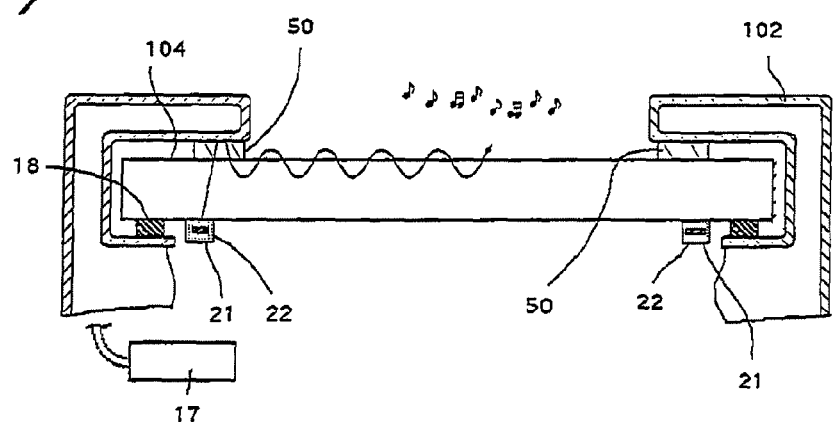
FIG. 17 is a schematic view showing that vibration of the touch panel combined with the speaker is attenuated by an elastic member frame.
Figure 18:
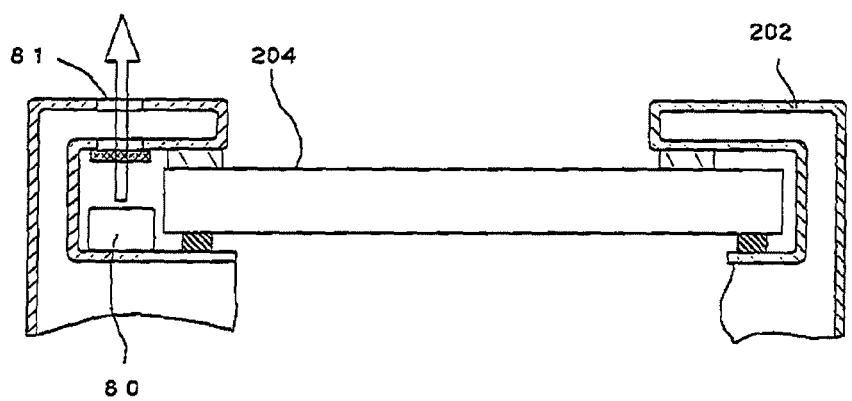
FIG. 18 is a schematic view showing a mount structure of a speaker in a portable telephone with a touch panel.

The touch panel 4 with the vibration function of the second embodiment also has the design sheet 9 having the transparent window part and the decorative part surrounding the transparent window part on the upper surface of the touch panel body 41, and this is externally fitted in the casing 2 as shown in FIG. 16, so that the seamless structure is provided such that there is no seam between the external surface of the touch panel 4 with the vibration function and the external surface of the casing 2. Therefore, the dust-proofness and the drip-proofness are excellent, and the vibration of the vibration element can be effectively transmitted. That is, the touch panel can sufficiently reproduce sound as the speaker.

[Variation]

Figure 7:
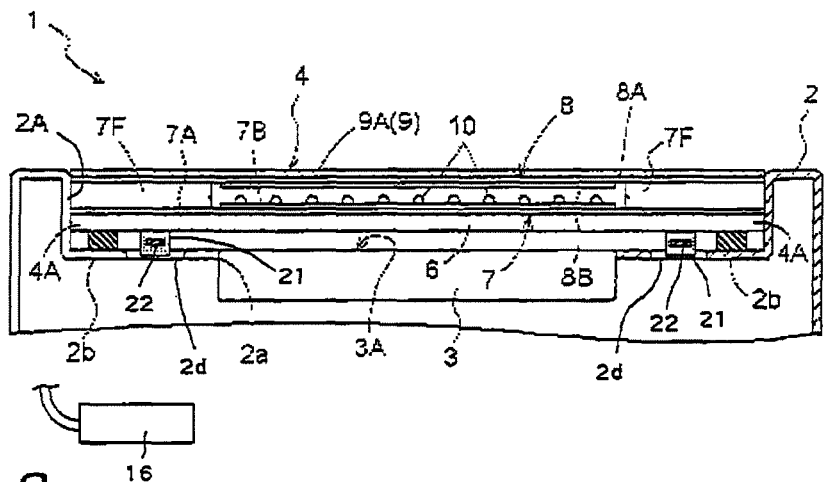
FIG. 7 is a cross-sectional view showing a variation of a mount structure of a touch panel with a vibration function.
Figure 8:
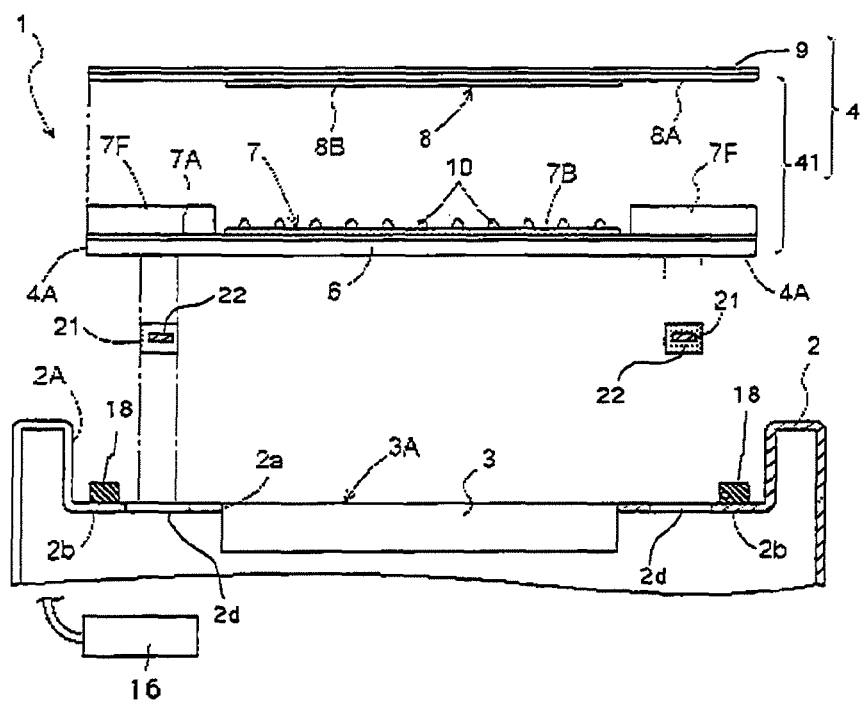
FIG. 8 is an exploded cross-sectional view showing the variation of the touch panel with the vibration function.
Figure 9:
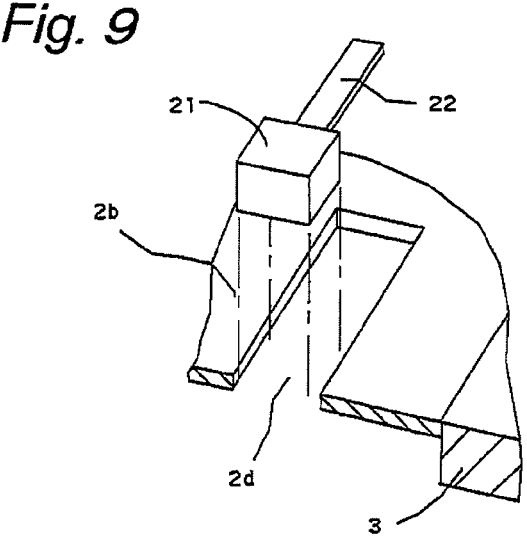
FIG. 9 is a perspective view showing a through hole part for vibration space of a casing.

(1) According to the first and second embodiments, the concave part for vibration space 2c is provided in the support part 2b to prevent the vibration element including the base part 21 and the piezoelectric element 22 from coming in contact with the support part 2b of the casing 2, but the means for preventing the contact is not limited to this, and a through hole part for vibration space (vibration space through hole part) 2d may be formed in the support part 2b (refer to FIGS. 7 to 9).

Figure 10:
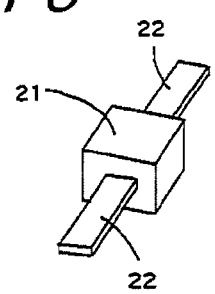
FIG. 10 is a perspective view showing a structure of a vibrator in another embodiment.

(2) According to the first and second embodiments, the cantilever-shaped piezoelectric element 22 extends from only one side of the base part 21, but as shown in FIG. 10, the cantilever-shaped piezoelectric element 22 may extend from both sides of the base part 21. In this case, greatness of the vibration of the tactile feedback type touch panel 4 can be adjusted.

(3) According to the first and second embodiments, the display window 2A of the casing 2 has the through opening part 2a provided in its bottom surface such that the display part 3A of the display device 3 provided inside the casing 2 is externally viewed, but a recess part to house the display device 3 itself may be formed instead of the opening part 2a.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

INDUSTRIAL APPLICABILITY

The present invention can be used for a mobile device such as a portable telephone, smart phone, PDA, car navigation device, digital camera, digital video camera, and portable game machine, and it is useful in industrial application.

REFERENCE SIGNS LIST 1 portable telephone
2 casing
2A display window
2b support part
2c concave part for vibration space
2d through hole part for vibration space
3 display device
3A display part
4 touch panel with the vibration function
4A surface peripheral part
6 support plate,
7 lower electrode film
8 upper electrode film
9 design sheet
9A transparent window part
9B decorative part
15 cushion layer
16 tactile feedback control unit
17 speaker control unit
18 elastic member frame (gasket)
21 base part
22 piezoelectric element
41 touch panel body
50 elastic member frame (gasket)
102 casing (with vessel)

The invention claimed is:

1. A mount structure of a touch panel with a vibration function comprising:
   a touch panel body;
   a design sheet bonded to an upper surface of the touch panel body, and having a transparent window part and a decorative part surrounding the transparent window part;
   a vibration element formed in a back surface peripheral part of the touch panel body, and hidden by the decorative part,
   a casing dented so as to have a level difference to allow the above parts to be externally fitted in, and having a recess part or an opening part for a display device, and a frame-shaped support part to support the back surface peripheral part of the touch panel body, in its bottom surface;
   an elastic member frame arranged on the support part and positioned on an outer edge side of the touch panel with respect to the vibrator; and
   a vibration control unit arranged inside the casing to apply a drive voltage to the vibration element, wherein
   a concave part for vibration space is formed in the support part of the casing to prevent contact with the vibration element at a time of vibration.

2. The mount structure of the touch panel with the vibration function according to claim 1, wherein
   a cushion layer is provided on a bottom surface of the concave part for vibration space.

3. A mount structure of a touch panel with a vibration function comprising:
   a touch panel body;
   a design sheet bonded to an upper surface of the touch panel body, and having a transparent window part and a decorative part surrounding the transparent window part;
   a vibration element formed in a back surface peripheral part of the touch panel body, and hidden by the decorative part;
   a casing dented so as to have a level difference to allow the above parts to be externally fitted in, and having a recess part or an opening part for a display device, and a frame-shaped support part to support the back surface peripheral part of the touch panel body, in its bottom surface;
   an elastic member frame arranged on the support part and positioned on an outer edge side of the touch panel with respect to the vibrator; and
   a vibration control unit arranged inside the casing to apply a drive voltage to the vibration element, wherein
   a through hole part for vibration space is formed in the support part of the casing to prevent contact with the vibration element at a time of vibration.

\* \* \* \* \*